Patented Aug. 25, 1925.

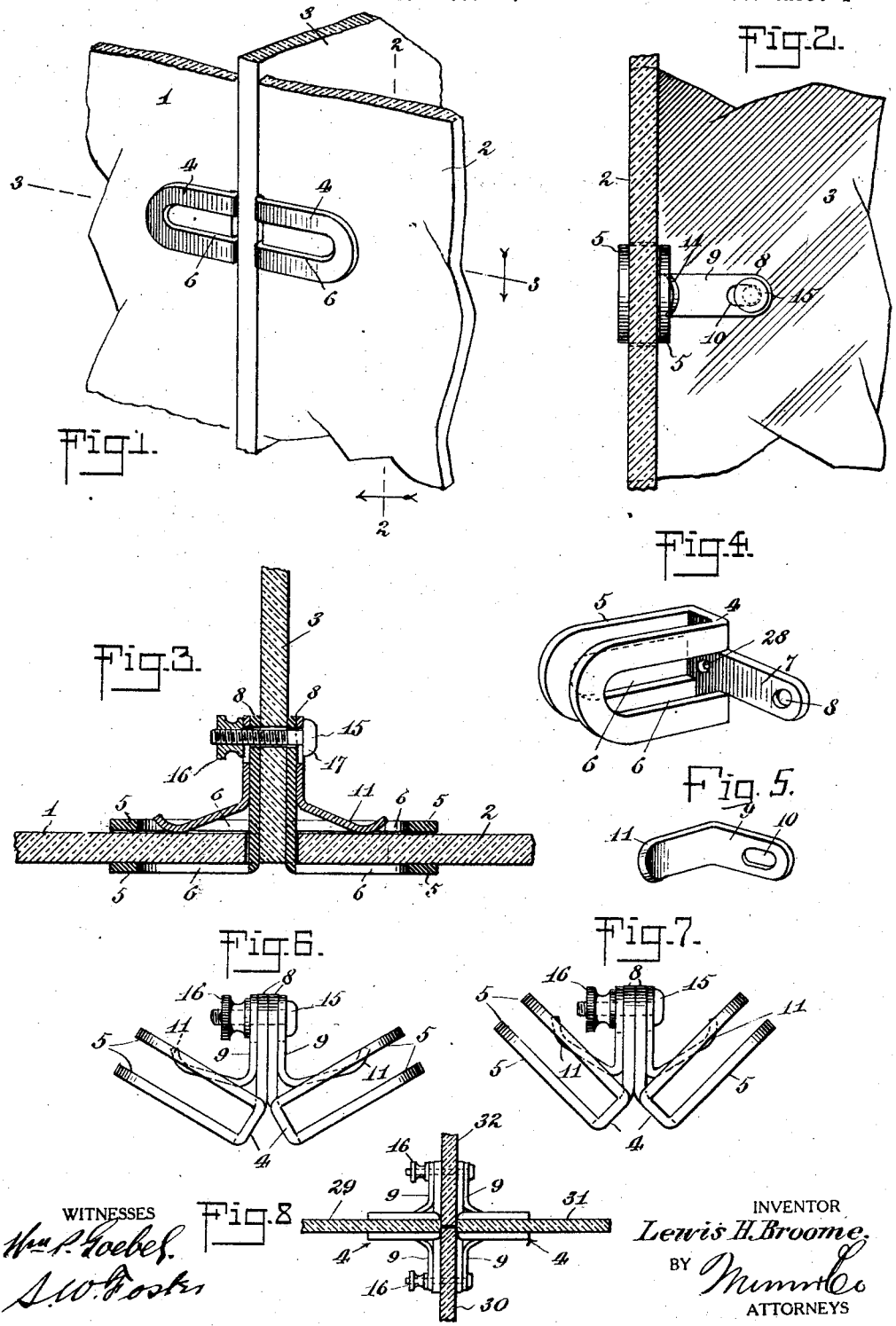

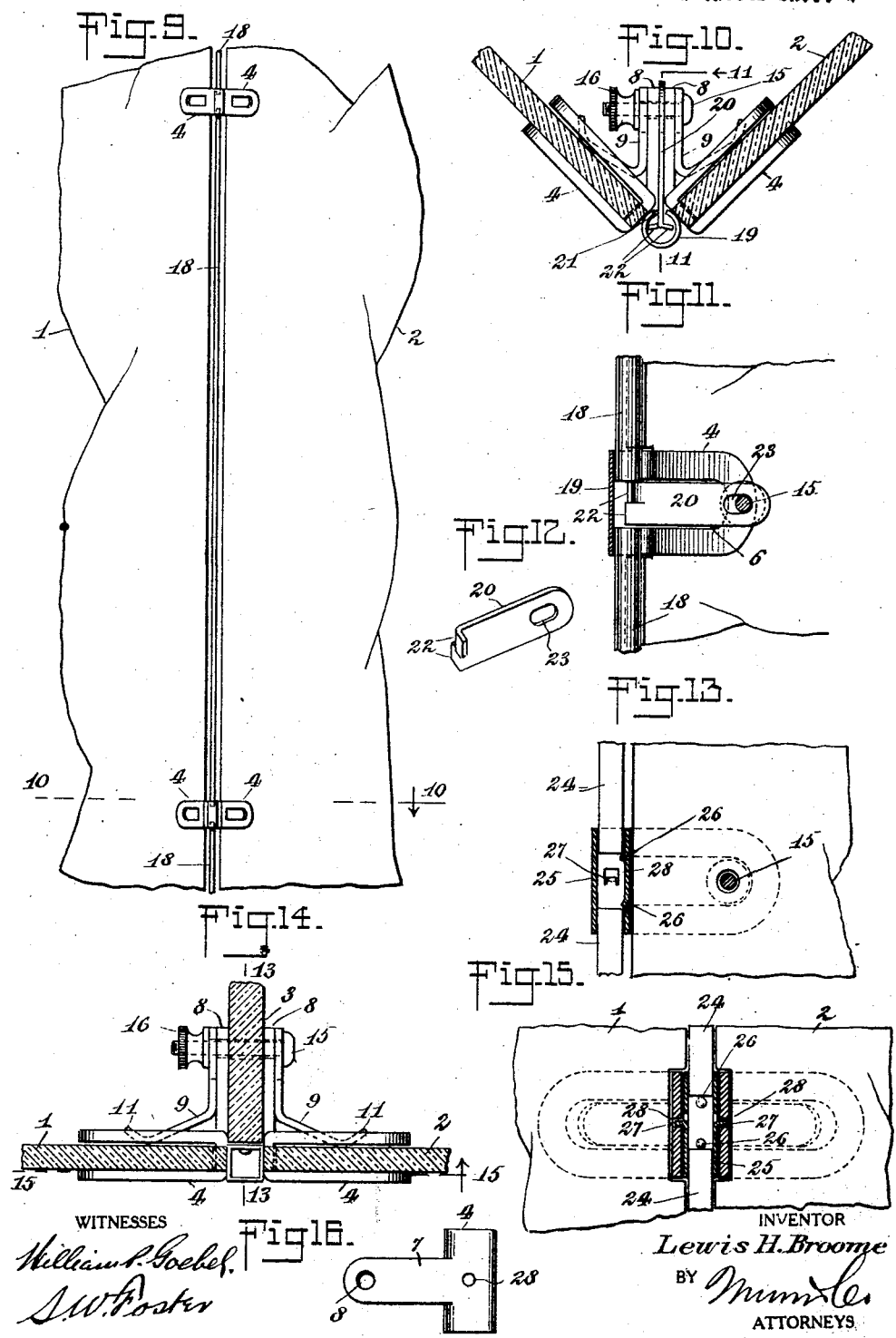

1,551,462

UNITED STATES PATENT OFFICE.

LEWIS H. BROOME, OF JERSEY CITY, NEW JERSEY.

GLASS-PANE-COUPLING DEVICE.

Application filed December 15, 1924. Serial No. 756,076.

*To all whom it may concern:*

Be it known that I, LEWIS H. BROOME, a citizen of the United States, and a resident of Jersey City, in the county of Hudson and State of New Jersey, have invented a new and Improved Glass-Pane-Coupling Device, of which the following is a full, clear, and exact description.

This invention relates to glass pane coupling devices, and more particularly to an improved arrangement and construction of clip with co-operating means for securing two, three or four panes of glass located at an angle to each other, an object of the invention being to provide securing means which not only facilitate the coupling of the panes and provide an attractive and ornamental finish but also result in a material economy over the practice such as heretofore employed.

With my improved securing means embodying clips and other devices, I dispense altogether with the necessity of beveling the edges of the glass and the expense incident thereto, and I provide an improved construction of clip which is capable of a wide range of adjustment to connect panes of glass at various angles and of various thicknesses, and which are capable of use with various forms of finishing devices to give the desired appearance or finish to the joint.

A further object is to provide clips and finishing devices of the character stated which can be manufactured, sold and installed at a relatively low price, which will be ornamental and attractive in appearance, and which will be most efficient in the performance of the functions for which they are intended.

This invention has particular reference to the art as disclosed in my copending application filed June 28, 1924, and given Serial No. 723,024.

With these and other objects in view, the invention consists in certain novel features of construction and combinations and arrangements of parts, which will be more fully hereinafter described and pointed out in the claims.

In the accompanying drawings—

Figure 1 is a perspective view showing my improved clips securing three panes of glass together;

Figure 2 is a view in longitudinal section on the line 2—2 of Figure 1;

Figure 3 is a view in transverse section on the line 3—3 of Figure 1;

Figure 4 is a perspective view of one of the clip members such as illustrated in Figures 1, 2 and 3;

Figure 5 is a perspective view of an angular pressure arm constituting a portion of each clip member;

Figure 6 is a view in top plan illustrating an assemblage of clip members showing the same at an obtuse angle to each other;

Figure 7 is a view similar to Figure 6 showing the clip members so bent as to locate them at a right angle to each other;

Figure 8 is a sectional plan view showing how my improved clips may be employed for securing four panes of glass together with the adjacent panes at right angles to each other;

Figure 9 is a view in front elevation showing my improved clips securing two panes of glass at an obtuse angle to each other;

Figure 10 is a view in transverse section on the line 10—10 of Figure 9;

Figure 11 is a view in longitudinal section on the line 11—11 of Figure 10;

Figure 12 is a perspective view of one of the coupling tongues;

Figure 13 is a view similar to Figure 11 illustrating a modification, the view being taken on the line 13—13 of Figure 14;

Figure 14 is a view in horizontal section illustrating another modified manner of employing my improved clips to secure three panes of glass together, the view being taken on the line 14—14 of Figure 15;

Figure 15 is a view in section on the line 15—15 of Figure 14;

Figure 16 is a view in side elevation of one of the clip members.

Referring more particularly to Figures 1 to 5, inclusive, 1, 2 and 3 represent panes of glass which are secured together by my improved clip members 4, 4. The panes of glass 1 and 2 are in alinement with the pane of glass 3 at right angles thereto and located between the meeting ends of the panes 1 and 2 and having its edge flush with the outer faces of the panes 1 and 2. My improved clip members 4, 4 are constructed precisely alike and hence the description hereinafter of one will apply alike to both.

Each clip member constitutes a bifurcated glass-receiving portion 5, this portion being preferably formed from an integral blank or strip of metal, and while one furcation is formed with a longitudinal opening or slot 6 the other furcation utilizes the metal which is struck from the same to form a like slot or opening 6 to provide an arm 7 which is projected at right angles to the bifurcated portion and is provided with an opening 8 near its free end.

Each clip member is provided with a pressure arm 9 which is of general angular form having a slot 10 adjacent one end and having its opposite end curved or bowed backwardly upon itself so as to provide a curved or smooth surface 11 for contact with the pane of glass. It will be noted that the arm 9 is of a width sufficient to allow it to freely pass through the opening 6 in the clip member and engage the glass, as indicated clearly in Figure 3.

In installing these clip members, the panes of glass 1 and 2 are provided with recesses 12 at their edges of sufficient width and depth to accommodate the connecting or base portion of the bifurcated clip members, allowing the bifurcated members to straddle the panes of glass.

The pane of glass 3 is made with an opening 14 to receive a bolt 15, the latter being projected through the slots 10 of the arms 9 and through the openings 8 of the arms 7, and the parts securely clamped together by a nut 16 screwed onto the threaded end of the bolt, it being understood, of course, that the bolt has a head 17 between which and the nut 16 the several parts may be securely clamped together. By providing the slots 10 in the pressure arms 9 these arms may be forced against the glass panes 1 and 2 with any desired pressure so as to prevent movement of the parts.

In Figures 6 and 7 I illustrate my improved clip members secured directly together and in position to hold the panes of glass at desired angles. When no partition glass 3 is employed, the clips are secured directly together, as indicated in Figures 6 and 7, and to illustrate this form of coupling in connection with the panes of glass attention is called to Figures 9 and 10, 11 and 12 of the drawings. In these views the window panes 1 and 2 are secured at an obtuse angle but it is obvious that they may be secured at any angle, it being simply necessary to bend the arms 7 at the desired angle relative to the bifurcated portions of the clips.

In Figures 9 to 12, inclusive, I have illustrated a form of finish which includes a somewhat cylindrical although longitudinally slotted bead 18 with coupling members 19 of similar shape which are secured to the clips by tongues 20. These coupling members 19 are relatively short and the tongues 20 project through the slots 21 in the coupling members and have laterally projected lugs 22 so that the end of the tongue is substantially T-shaped and will securely engage and hold the coupling 19.

Each tongue 20 is located between a pair of clip members and directly positioned between the arms 7 of said clip members and is formed with a slot 23 therein to receive the bolt 15. The slot 23 allows a certain amount of adjustment of the tongue to properly position the coupling 19, and when adjusted the parts are securely clamped by the bolt and nut.

The coupling 19 is of the same shape as the beads 18 so as to allow them to enter the opposite ends of the coupling, and these beads constitute a filler or finish, fitting within the angle formed by the panes of glass and giving an ornamental and attractive appearance.

It is to be understood that wherever desired cement may be employed to make the joint or joints tight after the panes of glass are assembled or during the assembling operation, as may be desired.

In Figures 13, 14 and 15 I illustrate my improved clips assembling three panes of glass 1, 2 and 3 in much the same manner as indicated in Figures 1, 2 and 3, with the exception that the pane 3 does not extend between the edges or ends of the panes 1 and 2. When coupling the panes of glass in this manner it is desirable to provide filler beads or finishing beads 24 of tubular form and rectangular in cross section with coupling members 25 of corresponding shape but larger in diameter to allow the beads to telescope therein at the desired distance.

To limit the telescoping movement of the beads or sections of beads I form projections or studs 26 in the couplings 25, as clearly indicated in Figure 15. To prevent longitudinal movement of these coupling devices in the clips I form projections 27 on the couplings which extend into openings 28 in the clip members, and while I have illustrated these projections as being stamped from the metal of the couplings it is obvious that they may be formed in any other way to provide means to directly engage the clips to prevent longitudinal movement of the coupling members.

In all uses of my improved clips it will be noted that the pressure arms 9 engaging the faces of the panes of glass will exert a certain amount of resilient cushioning contact which will not only prevent rattling but will absolutely secure the panes tightly within the clips yet will allow of a certain amount of movement which is desirable to prevent breaking or cracking of the panes due to vibrations to which panes of glass of this kind are necessarily subjected.

In order to accommodate the clips to any angles the glass panes may be located it is simply necessary to bend the arms 7.

In Figure 8 I illustrate my improved clips supporting four panes of glass 29, 30, 31 and 32. In using clips for this purpose I employ two pairs of clips which function and are located in a manner similar to that shown in Figure 1 with the exception, of course, that the panes of glass do not completely project through the space between the adjacent ends of other panes of glass but only half way through, as clearly indicated in Figure 8.

With my improved clips it is possible to secure panes of glass together at almost any angle and with a wide range of variation in the position and arrangement of the clips, and I do not, therefore, limit myself to the uses illustrated but consider myself at liberty to make such slight changes and alterations as fairly fall within the spirit and scope of the appended claims.

I claim:

1. Glass pane securing means including a pair of clips, each clip having a bifurcated glass pane-receiving portion, an arm integral with each bifurcated portion, and means for clamping the arms together.

2. Glass pane securing means including a pair of clips, each clip having a bifurcated glass pane-receiving portion, an arm integral with each bifurcated portion, means for clamping the arms together, said bifurcated portions having openings therein, pressure members projected through said openings and located in engagement with the panes of glass in the bifurcated portions, said pressure members and said arms having registering openings, a bolt projected through said openings, and a nut on said bolt.

3. Glass pane securing means including a pair of clips, each clip having a bifurcated glass pane-receiving portion, an arm integral with each bifurcated portion, means for clamping the arms together, said bifurcated portions having openings therein, pressure members projected through said openings and located in engagement with the panes of glass in the bifurcated portions, said pressure members and said arms having registering openings, a bolt projected through said openings, a nut on said bolt, a filler bead located between the coupling members, a coupling bead into which the ends of the filler bead project, and means for securing the coupling members to the clips.

4. Glass pane securing means including a pair of clips, each clip having a bifurcated glass pane-receiving portion, an arm integral with each bifurcated portion, means for clamping the arms together, said bifurcated portions having openings therein, pressure members projected through said openings and located in engagement with the panes of glass in the bifurcated portions, said pressure members and said arms having registering openings, a bolt projected through said openings, a nut on said bolt, a filler bead located between the coupling members, a coupling bead into which the ends of the filler bead project, and a tongue having a T-shaped end located in the coupling device, the main portion of said tongue being positioned between the arms of the clips and having an opening therein receiving the bolt.

5. Glass pane coupling means including a pair of bifurcated clips adapted to receive the panes, arms projecting from the bifurcated portions and adapted to be bent at an angle in accordance with the angular disposition of the panes to be coupled, adjustable pressure members connected to the arms and adapted to engage the panes of glass, ornamental filler devices located between the clips at the edges of the glass, and means adjustably clamped between the arms for holding the filler beads.

LEWIS H. BROOME.